US009537535B2

(12) United States Patent
Lortz et al.

(10) Patent No.: US 9,537,535 B2
(45) Date of Patent: Jan. 3, 2017

(54) MULTI-RADIO WIRELESS FLASH DRIVE USING NFC

(71) Applicant: INTEL CORPORATION, Santa Clara, CA (US)

(72) Inventors: Nathan V. Lortz, Beaverton, OR (US); Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 13/853,244

(22) Filed: Mar. 29, 2013

(65) Prior Publication Data

US 2014/0295754 A1 Oct. 2, 2014

(51) Int. Cl.
*H04B 5/00* (2006.01)
(52) U.S. Cl.
CPC ......... *H04B 5/0031* (2013.01); *H04B 5/0037* (2013.01); *H04B 5/0075* (2013.01)
(58) Field of Classification Search
CPC ....... H04B 5/00; H04B 5/0025; H04B 5/0031; H04B 5/0037; H04B 5/0062; H04B 5/0075; H04B 5/02
USPC .............................................. 455/41.1, 41.2
See application file for complete search history.

(56) References Cited

U.S. PATENT DOCUMENTS

| | | | |
|---|---|---|---|
| 6,556,668 B1 * | 4/2003 | Achuthan | H04M 15/00 379/114.01 |
| 8,145,201 B2 * | 3/2012 | Redi | 455/420 |
| 8,238,972 B2 * | 8/2012 | Wang | H04N 5/64 455/550.1 |
| 2006/0057960 A1 * | 3/2006 | Tran | H04L 63/08 455/41.2 |
| 2007/0203981 A1 * | 8/2007 | Takano et al. | 709/204 |
| 2008/0081667 A1 * | 4/2008 | Parikh et al. | 455/558 |

(Continued)

FOREIGN PATENT DOCUMENTS

| | | |
|---|---|---|
| CN | 102315864 | 1/2012 |
| JP | 2012-234517 A | 11/2012 |

(Continued)

OTHER PUBLICATIONS

"Eye-Fi 16GB Pro X2 SDHC Class 10 Wireless Flash Memory Card Frustration Free Packaging EYE-FI-16PC-FF", From Amazon, Item model No. EYE-FI-16PC-FF, first available at Amazon.com: Oct. 1, 2012, Webpage available at: http://www.amazon.com/Eye-Fi-Wireless-Frustration-Packaging-EYE-FI-16PC-FF/dp/B0090XWU8S/ref=sr_1_1?s=electronics&ie=UTF8&qid=1361301734&sr=1-1&keywords=eye+fi.

(Continued)

*Primary Examiner* — Nguyen Vo
(74) *Attorney, Agent, or Firm* — Sutherland Asbill & Brennan LLP (57) ABSTRACT

A wireless flash drive may use a Near Field Communication (NFC) radio link with a second device to establish a second, non-NFC, radio link with the second device, and then use the non-NFC link to wirelessly transfer data between the second device and the non-volatile memory in the flash drive. Some embodiments may also have other features, such as a switch to activate the non-NFC link without using the NFC link, a battery to power the non-NFC radio and the non-volatile memory, inductive charging circuitry to wirelessly recharge the battery, or instructions to be uploaded to the second device for use in establishing the non-NFC link.

20 Claims, 7 Drawing Sheets

(56) References Cited

U.S. PATENT DOCUMENTS

| | | | |
|---|---|---|---|
| 2008/0090520 A1* | 4/2008 | Camp | H04B 5/00 |
| | | | 455/41.2 |
| 2009/0222659 A1 | 9/2009 | Miyabayashi et al. | |
| 2009/0227282 A1* | 9/2009 | Miyabayashi et al. | 455/552.1 |
| 2010/0167648 A1 | 7/2010 | Doutriaux | |
| 2011/0070828 A1* | 3/2011 | Griffin et al. | 455/41.1 |
| 2011/0177780 A1* | 7/2011 | Sato et al. | 455/41.1 |
| 2012/0238205 A1* | 9/2012 | Reunamaki et al. | 455/41.1 |
| 2013/0029596 A1 | 1/2013 | Preston et al. | |
| 2013/0281015 A1* | 10/2013 | Aho | H04B 5/0062 |
| | | | 455/41.1 |
| 2013/0303263 A1* | 11/2013 | LeMay et al. | 463/25 |
| 2014/0127992 A1* | 5/2014 | Kuscher et al. | 455/41.1 |
| 2014/0287681 A1* | 9/2014 | Ollikainen et al. | 455/41.1 |

FOREIGN PATENT DOCUMENTS

| | | |
|---|---|---|
| KR | 10-2013-0005019 A | 1/2013 |
| TW | M438717 U | 10/2012 |
| WO | 2014/160952 A1 | 10/2014 |

OTHER PUBLICATIONS

"Maxell AirStash Expandable Capacity Wireless Flash Drive A02 (Included Starter 16GB Class 10 SDHC Card)", From Amazon, Brand Name: Maxell, Item model No. 666601, first available at Amazon.com: Nov. 25, 2011, Webpage available at: http://www.amazon.com/Maxell-AirStash-Expandable-Capacity-Wireless/dp/B006473T92/ref=sr_1_1?s=electronics&ie=UTF8&qid=1361305795&sr=1-1&keywords=air+stash.

International Search Report and Written Opinion received for PCT Patent Application No. PCT/US2014/032198, mailed on Jul. 28, 2014, 15 pages.

Search report for Taiwanese patent application No. 103105117 mailed Jul. 31, 2015. 1 page Taiwanese search report, 1 page English Translation.

Office Action from Chinese Application No. 201480009500.X mailed May 27, 2016. (18 pgs., including 9 pgs. translation).

\* cited by examiner

MULTI-RADIO WIRELESS FLASH DRIVE USING NFC

BACKGROUND

In recent years, so-called 'flash drives' have become commonplace as detachable storage devices for personal computers and similar portable computer devices. Such storage devices are generically referred to as flash drives because they most often use flash memory as the non-volatile memory technology, and because the associated software drivers may resemble the software drivers for traditional disk drives. The progress of flash drives in the industry has been characterized by a continual increase in storage capacity and a continual decrease in price per unit of storage. But one shortcoming has not seen much improvement—although many peripheral devices are converting to wireless connectivity, flash drives typically only transfer data through a hard-wired universal serial bus connector. Besides being inconvenient, it's easy to forget to remove the flash drive when finished, leaving it vulnerable to breakage, loss, or theft. Attempts to convert flash drives to wireless have generally suffered from at least one of these problems: 1) slow data transfer rates, 2) excessive manual setup by the operator to initiate a transfer, or 3) poor security protections.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of various operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, at least one memory, and at least one processor, where the radio(s) transmits signals through the antenna(s) that represent data and receives signals through the antenna(s) that represent data, while the processor(s) may process the data to be transmitted and the data that has been received. The processor(s) may also process other data which is neither transmitted nor received.

Within this document, the following terms have the following meanings. Some of these meanings are broader than the definitions commonly used in the industry.

Communicate—wireless transmitting and/or wireless receiving. This may be particularly useful in claims when describing data that is being transmitted by one device and received by another, but only the functionality of either one of those devices is required to infringe the claim. Similarly, the exchange of data between two devices (each device both transmits and receives during the exchange) may be described as 'communicating', when only the functionality of one of those devices is being claimed.

Flash drive—a small, portable, non-volatile (NV) memory device, to be used primarily for saving data from a computer in a device that is physically separable from the computer, or to transfer data between two or more computers by storing the data from one computer in the NV memory device and manually carrying the device to the another computer for loading the data. The adjective 'flash' does not limit the flash drive to flash memory technology, and the term 'drive' does not require the device to have any similarity to a disk drive.

WiFi Radio—a radio that complies with the requirements of any of the wireless standards in the IEEE 802.11 family of standards.

60 GHz Radio—a radio that communicates over one or more frequencies in the 55-65 Gigahertz range.

Personal Computer—An electronic device having at least one processor, at least one input device to receive inputs from a human user, at least one output device to deliver outputs to a human user, at least one NFC wireless radio and at least one non-NFC wireless radio.

Devices

Figure 1:
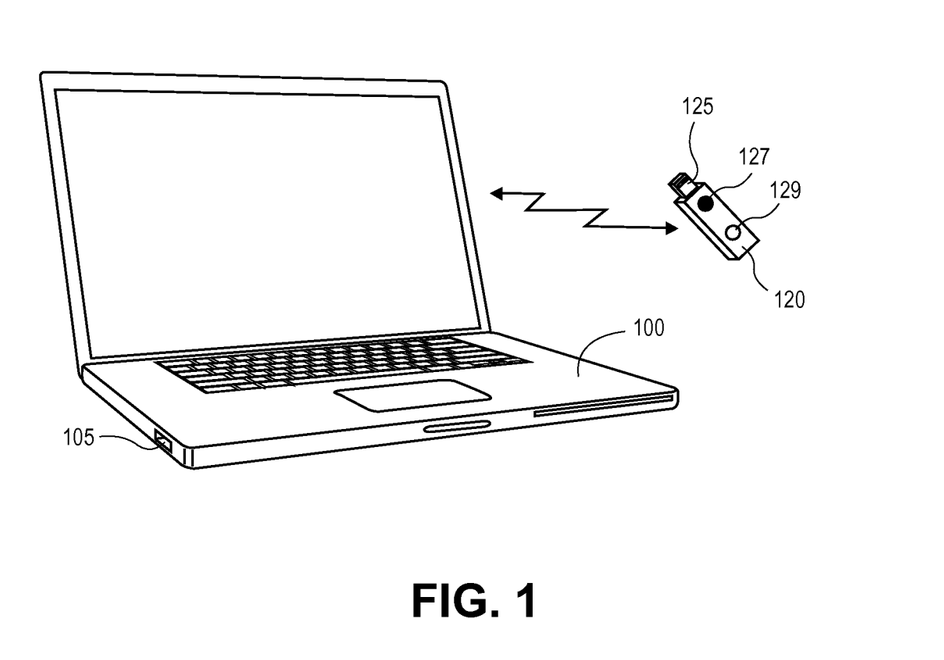
FIG. 1 shows a personal computer device and a wireless non-volatile memory device, according to an embodiment of the invention.

FIG. 1 shows a personal computer device and a wireless non-volatile memory device, according to an embodiment of the invention. In the illustrated example, the personal computer device 100 is shown as a notebook computer, but in other embodiments it might be any device that is capable of transferring data between itself and a detachable storage device with non-volatile (NV) memory. Detachable NV storage device 120 is shown as a flash drive with a standard form factor, but other embodiments may have any suitable form factor and may use any suitable type of NV memory. Connector 105 on the personal computer device and connector 125 on the flash drive are also shown as connectors that may be physically and electrically connected together when the flash drive is plugged into the personal computer device. Again, for convenience and ease of illustration these are shown with standard form factors, but other embodiments may have different form factors.

Wireless flash drive 120 is also shown with one or more indicators 127 and one or more buttons 129. An indicator may use any feasible technology, such as but not limited to an LED. It may be used to indicate any feasible condition or state, such as but not limited to: 1) circuitry in the flash drive is powered up, 2) a wireless link with another device is active, 3) a data transfer is in progress, 4) etc. A button may use any feasible technology, such as but not limited to a push button, a slide button, or a capacitive sensor. The button may be used to trigger any feasible action within the wireless flash drive.

Figure 2:
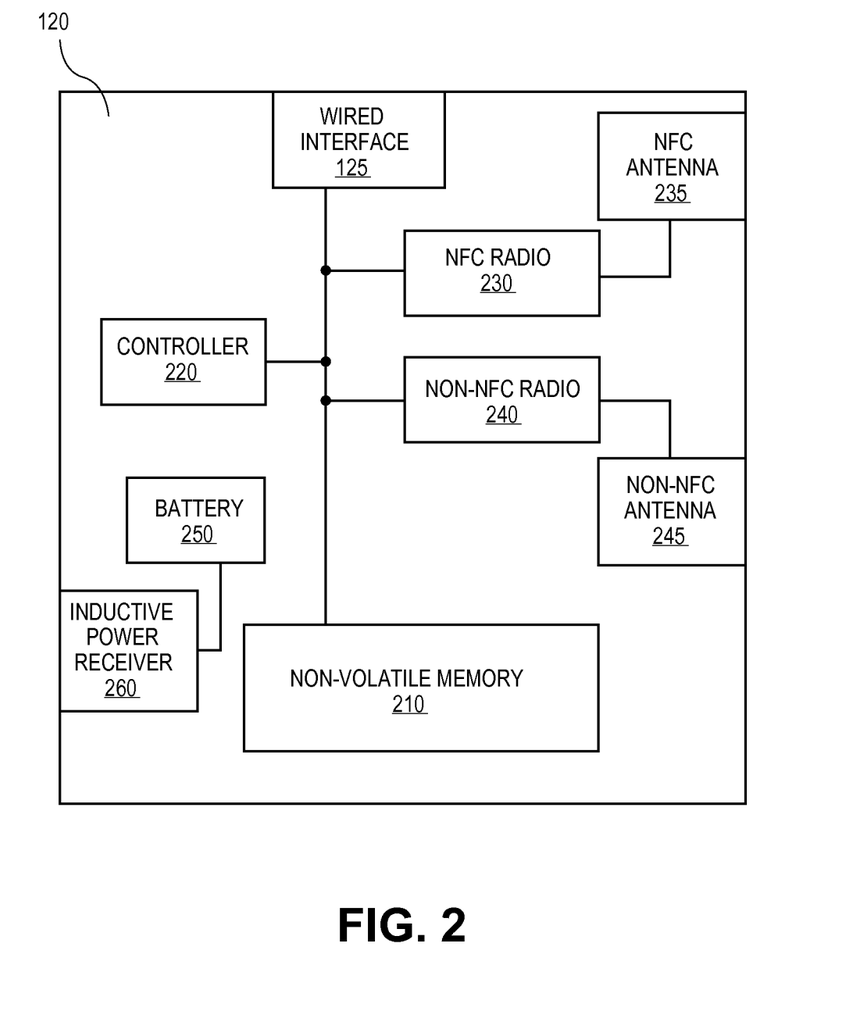
FIG. 2 shows a block diagram of a wireless flash drive, according to an embodiment of the invention.

FIG. 2 shows a block diagram of a wireless flash drive, according to an embodiment of the invention. In the illustration, flash drive 120 is shown with a wired interface 125, which in some embodiments may be a universal serial bus (USB) interface, although other types of interfaces may be used. Flash drive 120 is also shown with NV memory 210, which may serve the flash drive's primary purpose of storing data externally to the device(s) that might use this data. In some embodiments, NV memory 210 may also be used to store one or more of these types of data: 1) software which can be transferred to another device for execution by that other device to communicate wirelessly with this flash drive, 2) software for execution in this flash drive to perform the operations of this flash drive, 3) other data used to perform the operations of this flash drive, 4) etc.

In addition, flash drive 120 is shown with a controller 220 that may control the overall operations within the flash drive. Controller 220 may contain any of, but is not limited to, one or more processors, a state machine, discrete circuitry, and/or any other feasible components for performing its functions. In some embodiments that use instructions for performing the controller's functions, instructions for the operation of the controller may be contained in NV memory 210, but in other embodiments those instructions may be contained in a separate memory in the controller.

Flash drive 120 is also shown with a near-field communications (NFC) radio 230 with its associated antenna 235, and another, non-NFC, radio 240 with its associated antenna 245. In some embodiments radios 230 and 240 may share some components, and in some embodiments antennas 235 and 245 may share some components, if such sharing is technically feasible. A battery 250 is also shown, to provide electrical power for operating some of the various components of the flash drive, such as but not limited to the NV memory and the non-NFC radio.

Non-NFC radio 240, as well as its associated antenna, may conform to any of various standards, such as but not limited to those popularly known as WiFi, 60 GHz, Bluetooth, and others. One of the main considerations for this selection may be that the chosen radio technology is able to transfer fairly large amounts of data at a fairly high data rate, over a reasonable distance. Although NFC could be used to transfer data, it's generally limited to comparatively slow data rates (which make it unsuitable for transferring large amounts of data) and has very limited range (e.g., 4-5 cm), which make it awkward to use for large data transfers that require more than the traditional 'bump' transfer.

On the other hand, the previous popular radio technologies that don't suffer from these shortcomings generally have a burdensome setup process to establish a link, and need to continuously monitor the surrounding RF environment, which can create unacceptable power consumption for battery-powered devices. An NFC radio, despite its shortcomings in range and data rate, can remain powered down until it senses NFC signals coming from another device. When the NFC radio detects a signal from another device and powers up, the NFC circuitry can be used to initiate power up of other circuits, including other radios, on the device Therefore, the various embodiments of the invention may use the NFC radio to establish that another NFC-enabled device is nearby and wants to establish a more robust communication, and use an NFC link to trigger a separate data transfer with that device over a non-NFC radio link. This technique may be used to allow a fairly large wireless data transfer between a wireless flash drive and another device, without the need to physically connect the two devices, and without the need to keep the high-data-rate radio powered up at all times.

A wireless flash drive with these characteristics may contain a battery to power the non-NFC radio and the NV memory during a wireless transfer. However, since a small form factor and low cost is generally desirable in a flash drive, the size of the battery may be limited by practical considerations, and occasional charging of the battery may therefore be necessary. For this reason a standard wired interface, such as interface 125 in FIG. 2, may be used to charge the battery whenever the flash drive is plugged into another device through this interface. The standard USB interface which is commonly used in conventional flash drives has power pins which can be used for such battery charging and may also permit the wireless flash drive to be operated in the conventional hard-wired manner if desired. Alternatively, various forms of inductive electrical power transfer may be used to recharge the battery, using an inductive power receiver 260. The inductive power receiver is shown as separate from the NFC radio/antenna, although in some embodiments some components may be shared between the two.

Basic Operation

Figure 3:
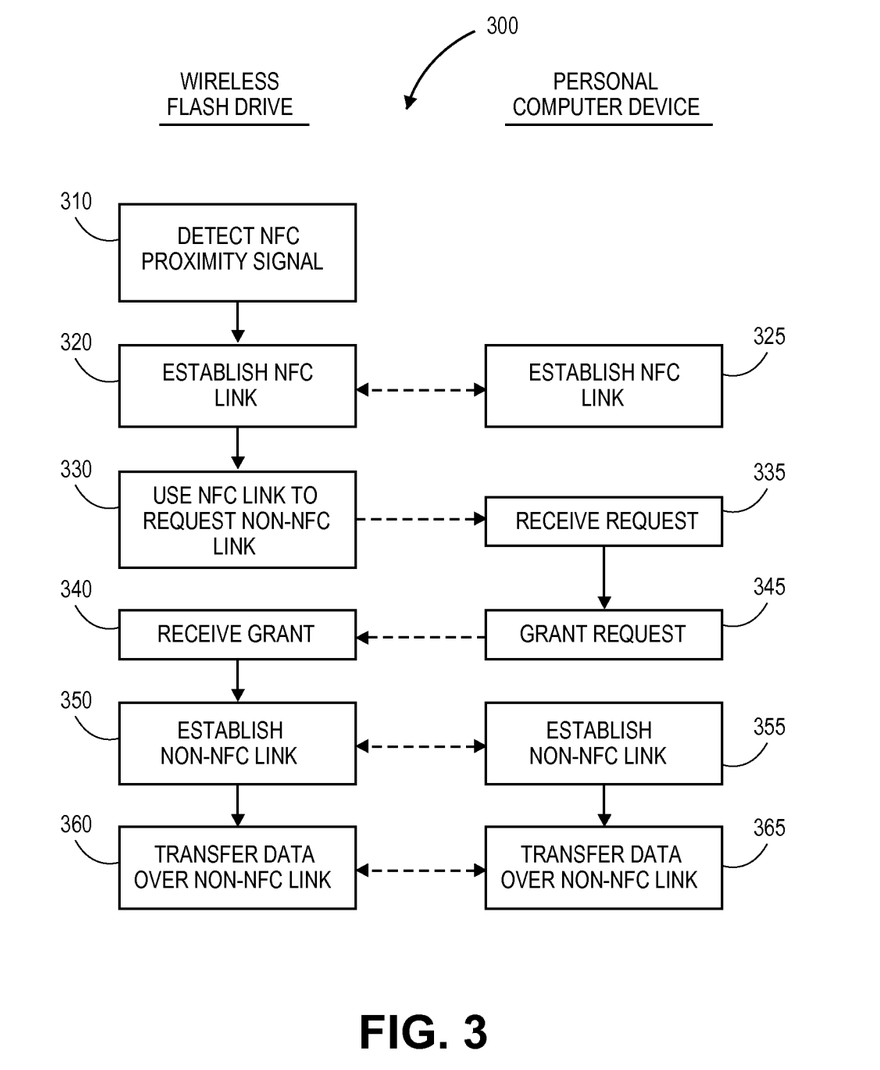
FIG. 3 shows a flow diagram of a method for wireless communication between a non-volatile memory and another device, according to an embodiment of the invention.

FIG. 3 shows a flow diagram of a method of wireless communication between a non-volatile memory and another device, according to an embodiment of the invention. Dashed lines in FIG. 3 represent wireless communication between the two indicated devices. In this illustrated embodiment, a wireless flash drive with an NFC radio may be placed in close proximity to another device with an NFC radio, where the other device is capable of wirelessly reading data from, or wirelessly writing data to, a flash drive. This other device may be, but is not limited to, a desktop computer, personal computer, a tablet computer, a smart phone, etc. For simplicity, a personal computer device is described, but any feasible device may be used. The flash drive may use electromagnetic energy harvested from the received NFC signal to power its NFC radio.

In flow diagram 300, at 310 the flash drive may be brought into close proximity to the personal computer, allowing the two devices to recognize each other's presence through their NFC radios. As a result of such detection, at 320 and 325 the two devices may establish an NFC communications link with each other.

At 330, the wireless flash drive may send a request over the NFC link to establish an additional wireless link between the two devices, with the additional wireless link having the capability for a higher data rate and/or a longer range than the NFC link. Various types of wireless connections may be used for this additional link, such as but not limited to: 1) WiFi, 2) Bluetooth, 3) 60 GHz, 4) etc. The request may be received by the personal computer device at 335. If it agrees to the request, it may transmit a grant at 345 over the NFC link, which may be received by the wireless flash drive at 340.

If the wireless flash drive has only a single type of radio available for this additional link, it may specify this link in the request. If it has more than one type, it may list them in the request. If the personal computer has only a single type of radio available for this additional link, and it is the same type of radio as one of the radio type(s) specified in the request, it may grant the request at 345, indicating the type of radio in the grant. If both the wireless flash drive and the personal computer have multiple types of radios available for this additional link, the personal computer may select one of the radio types specified in the request and indicate that selection in the grant.

The exchange just described assumes that the wireless flash drive requests the additional link and the personal computer grants the request. However, in some embodiments the personal computer may request the additional link and the wireless flash drive may grant the request. In either case, various exchanges of information may take place over the NFC link to reach this agreement to establish another radio link.

Once agreement has been reached, the two devices may establish the communications link over the agreed-upon radio at 350 and 355. Depending on the type of radio link, this establishment may involve multiple exchanges of data between the two devices. Since every type of radio technology may have its own different requirements for establishing a link, this process is not described here in detail.

After the additional link has been established, the two devices may use this link to transfer data between each other at 360 and 365. Because this is a flash drive, it is expected that most, if not all, of this data will involve the personal computer writing data into, or reading data out of, the wireless flash drive, similar to what they would do if the two devices were physically joined using connector 125 in FIG. 1. However, in some embodiments the two devices may use the additional link to transfer other information between them.

In some operations, the NFC link may no longer be needed once the additional link has been established. In such cases, the wireless flash drive may be moved away from the personal computer after the additional link is established, thus breaking the NFC link, which has a very short radio range. In some embodiments, one or more indicators on the wireless flash drive may be used to indicate the additional link has been established and the NFC link is no longer needed. In some embodiments, an indicator on the personal computer may be used to indicate this condition. The wireless flash drive may then be set aside, placed in the user's pocket, or placed in any other convenient place that is still within the effective range of the additional link, until the additional link is no longer needed. When the additional link is no longer needed, that link may also be terminated. The determination that the link is no longer needed may be made by any of various means, such as but not limited to: 1) direct indication by the user, 2) indirect indication by the user, 3) timeout, 4) etc.

In some embodiments, the wireless flash drive may contain instructions that it can execute to perform the operations described herein for the flash drive. In some embodiments, the personal computer may contain instructions that it can execute to perform the operations described herein for the personal computer. And in some embodiments, the flash drive may contain a copy of the instructions to be executed by the personal computer, and those instructions may be transferred into the personal computer for execution. This transfer may take place through any feasible connection, but a preferred connection may be the physical connector 125. In some embodiments, this connector may be used for such a transfer of instructions, and may also be used for reading/writing data in the NV memory of the flash drive in a conventional manner. In this manner, the instructions for the personal computer may be discovered within the wireless flash drive, transferred into the personal computer through the connector, and then the personal computer and the flash drive will both have the necessary instructions to perform the operations described herein. In other embodiments, the wireless flash drive may pass a remote address such as a URL to the personal computer through the NFC link or USB link, indicating an online server or service from which the personal computer may download and install instructions to perform the necessary functions.

Uploading Software

Figure 4:
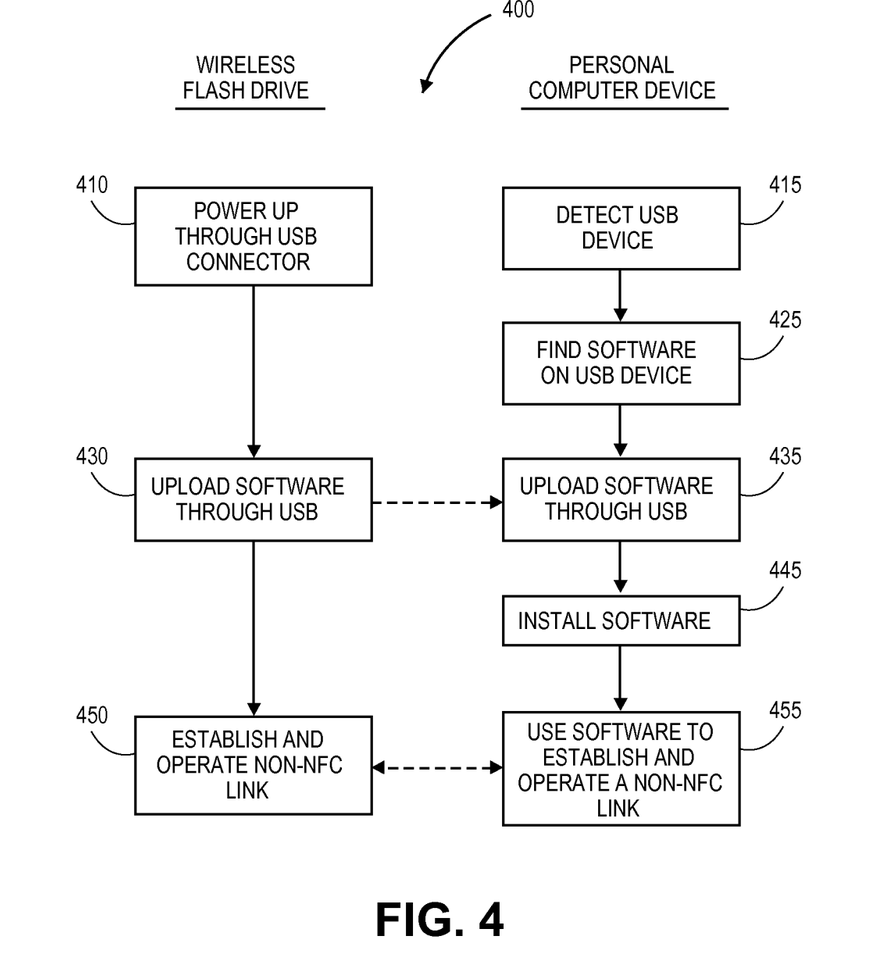
FIG. 4 shows a flow diagram of a method of transferring software to another device that the other device can use in communicating with the flash drive, according to an embodiment of the invention.

FIG. 4 shows a flow diagram of a method of transferring communications software from the flash drive to another device, which the other device can use in communicating with the flash drive, according to an embodiment of the invention. In flow diagram 400, at 410 the flash drive may power up by being connected to the personal computer through the Universal Serial Bus (USB) wired connection. At 415 the personal computer may detect the presence of a USB device, and by examining the contents may find software that can be used for communicating with the flash drive. This software may be uploaded from the flash drive to the personal computer through the USB connection at 430 and 435, and installed in the personal computer at 445.

While various types of software may be uploaded and installed in this manner, in this example the software enables the personal computer to establish another, non-NFC, wireless link with the flash drive at 450 and 455. In some embodiments, this software may include various parameters to limit the non-NFC link in some manner, such as limiting it to use with wireless flash drives, limiting it to devices made by a particular manufacturer, requiring particular security features, etc. It should also be pointed out that the software for some types of wireless radio communication may already be in the personal computer, in which case this upload operation may not be necessary.

The non-NFC link may be any of various types of wireless links (except NFC, of course). WiFi, Bluetooth, and WiGig (60 GHz) are three types of non-NFC link that have characteristics that would be desirable, such as high data rates, established security protocols, and a range of at least a few feet, but other types of wireless communication may be used.

Manual Operation and Power Saving

Once the flash drive and personal computer have correct information to establish a satisfactory non-NFC link, in some embodiments the NFC link may no longer be needed for starting the non-NFC link, and the non-NFC link may be started through some other means. In some embodiments, the power in the flash drive may remain off until the user activates it by pushing a button or performing some other manual activity.

Turning off power in the flash drive when the data transfer(s) are over may reduce battery consumption. This may be done in any of several ways, such as but not limited to: 1) Pushing another button, 2) pushing the same button again, 3) turning off power automatically if no data is transferred within a pre-defined time period. Some kind of indicator may be used to tell the user whether the flash drive is currently powered on, such as but not limited to: 1) an LED light, 2) an image on a liquid crystal display, 3) a periodic beeping sound when the device is active, 4) etc.

Figure 5:
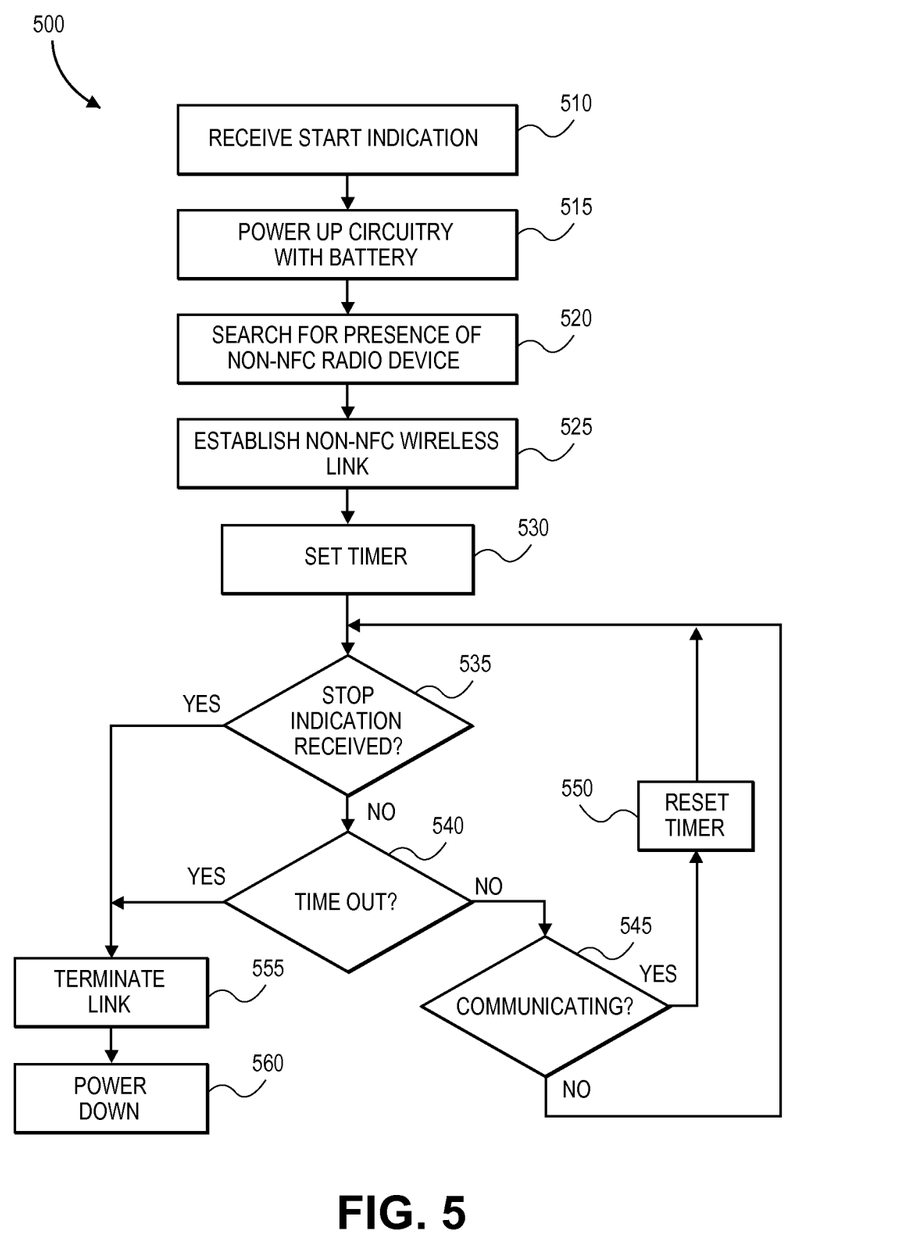
FIG. 5 shows a flow diagram of a method of manually activating a non-NFC radio link, according to an embodiment of the invention.

FIG. 5 shows a flow diagram of a method of manually activating a non-NFC radio link, according to an embodiment of the invention. In flow diagram 500, the wireless flash drive may receive a start indication at 510, which causes the battery to power up the circuitry in the flash drive at 515. This indication may be of any feasible type, such as but not limited to closing a switch by pushing a button or sliding a protective housing on the flash drive. Once the flash drive is powered up, it may begin searching for the presence of a non-NFC radio signal at 520. Various such discovery procedures are known and will not be repeated here to avoid obscuring the embodiments of the invention. When such a non-NFC presence is detected, the two devices may establish a non-NFC wireless link at 525, thus enabling a communications path for transferring data between the flash drive and the personal computer.

It is anticipated that data transfers between the flash drive and the personal computer will often be bursty in nature, with the time occupied by actual data transfers being only a small fraction of the total time the link is active. This may be due to several factors, such as but not limited to the user taking time to set up for a data transfer, the user browsing through the data files in the flash drive, etc. It's also anticipated the user may sometimes forget the link is active, thus unknowingly causing additional battery drain after the user has finished using the flash drive. Therefore it will be useful to have various mechanisms to turn off the power in the flash drive even though the flash drive and personal computer are still within non-NFC communications range.

Operations 530-560 show two techniques for accomplishing such a power down. One involves having the user manually initiate a power down, while the other involves automatically turning off the power if the flash drive goes for a predetermined period of time without any data transfers. Various embodiments may include either one or both of these techniques, but the flow diagram shows an embodiment with both.

At 530, the flash drive may set an internal timer, which may then be used to determine how long the flash drive has gone without a data transfer. In some embodiments this time period may be selectable by the user, but in others it may be set at the factory. The timer may be implemented in any feasible form, such as but not limited to a hardware counter or a software counter. In some embodiments the timer may be part of a controller, such as controller 220 in FIG. 2.

At 535 the flash drive may check for receipt of a stop indication, to initiate a power-down operation. As mentioned previously, this indication may be triggered by a switch operated by the user. In some embodiments the switch may be the same switch that was used to power up the device (e.g., the signal generated by the switch may toggle between power-on and power-off indications). In other embodiments the power-up and power-down indications may come from separate switches. Other mechanisms may also be used to initiate a power-down indication. If a power-down is indicated, the flash drive may power down at 560. In some embodiments, the flash drive may first signal the personal computer that the wireless link is being terminated, so that the personal computer will not continue to expect communications from the flash drive.

If a stop indication was not received at 535, the flash drive may then check to see if the timer, which was set at 530, has timed out. If it has, indicating there has been no data transfer during the relevant time period, then the flash drive may shut down by executing the operations of 555 and 560, as previously described. If the timer has not timed out, the flash drive may check to see if a communication with the personal computer is taking place. In some embodiments, such communication may include preparing to engage in a communication, even if the actual communication has not yet started.

If communication is detected at 545, the timer may be reset at 550 before returning to operation 535. In this way, the timer may be repeatedly used to indicate if the flash drive has gone beyond a pre-determined time period without a data transfer, and power itself down if this occurs. Collectively, decision points 535, 540, and 545 may be used to power down the flash drive if 1) the user manually triggers such a shutdown, or 2) the flash drive experiences no data transfers for a predetermined period of time.

Figure 6:
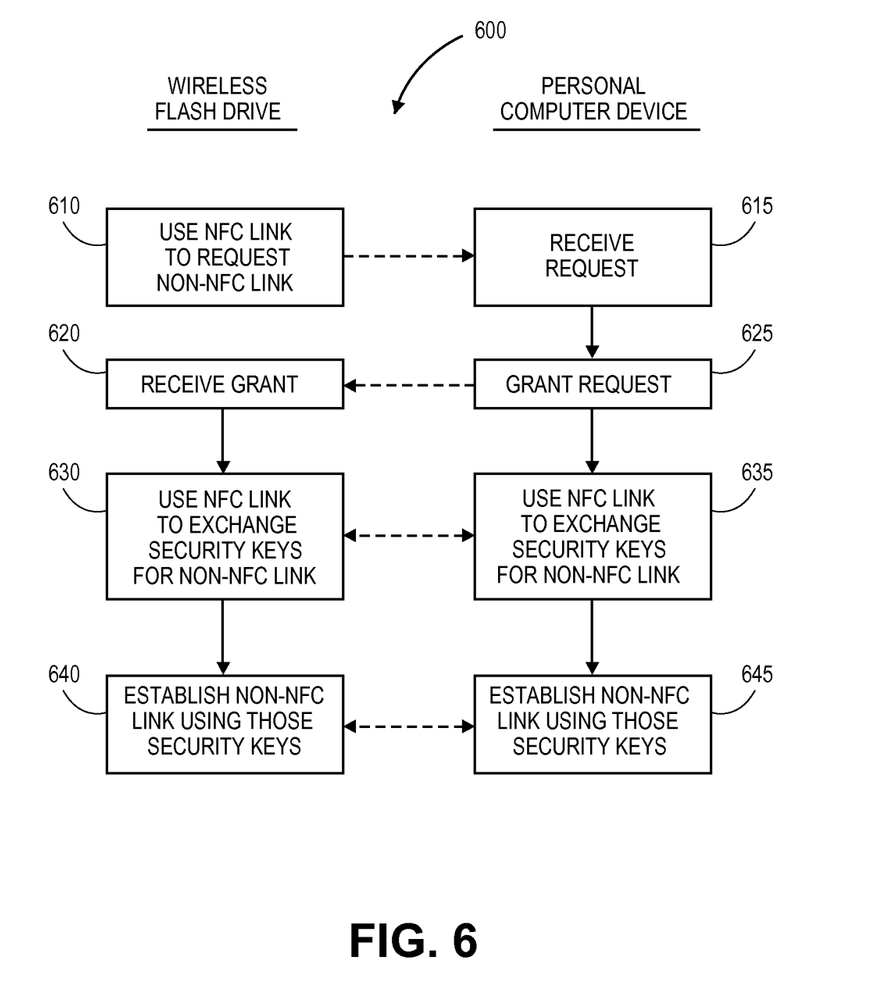
FIG. 6 shows a flow diagram of a method of using an NFC wireless link to exchange security keys for a secure non-NFC wireless link, according to an embodiment of the invention.

FIG. 6 shows a flow diagram of a method of using an NFC wireless link to exchange security keys for a secure non-NFC wireless link, according to an embodiment of the invention. In flow diagram 600, a wireless flash drive may use an NFC wireless link to transmit a request to a personal computer to establish a non-NFC wireless link. The requested non-NFC link may be any suitable type of wireless link, such as but not limited to WiFi, Bluetooth, or WiGig. The personal computer may receive that request through its NFC radio at 615, and transmit a grant at 625, which the flash drive may receive at 620.

Once the devices have agreed to establish this non-NFC link, they may exchange various parameters that will define how they will communicate over the non-NFC link. These exchanged parameters may include one or more security keys that the two devices can use to provide some level of security over that non-NFC link. These security keys may be exchanged at 630 and 635. The exact nature of these security keys, and the manner of deriving them, may depend on various factors, such as but not limited to the type of non-NFC link to be used, and the level of security desired. Once the parameters, including the security keys, have been exchanged, the two devices may establish the non-NFC link at 640 and 645, and use those keys to exchange information wirelessly in a secure manner.

Exchanging the security keys over the NFC link has a number of advantages. One such advantage is that the very short range of NFC communications (a few inches) makes it very difficult for outside devices to surreptitiously monitor the NFC exchange and intercept these keys. If the keys are exchanged over the non-NFC link as a part of establishing that link, malicious operators may monitor the signals from many feet away, learn the keys, and use the keys to decode the supposedly secure communications that follow. To learn the keys by monitoring the NFC exchange, an eavesdropping device would need to be within a few inches of the devices, which is typically very unlikely.

Figure 7:
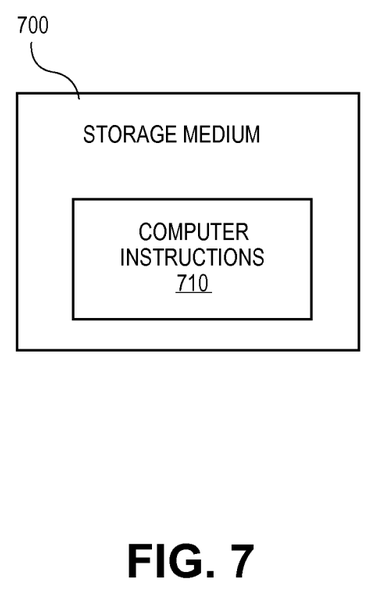
FIG. 7 shows a block diagram of a storage medium containing computer instructions, according to an embodiment of the invention.

FIG. 7 shows a block diagram of a storage medium containing computer instructions, according to an embodiment of the invention. Storage medium 700 may be any type of storage medium containing instructions and/or data that may be read by one or more computer devices. The instructions 710 may be instructions that, when executed by the one or more computer devices, cause any of the operations described in this document to be performed. The storage medium may be any feasible storage medium, such as but not limited to volatile semiconductor memory, non-volatile semiconductor memory, and magnetic memory. The instructions may be contained on one or more such storage mediums, and may be found internal or external to the devices described in this document.

Various ones of the features described herein may be implemented in a particular product singly or in combination with other ones of the features. For example, powering up the flash drive may be triggered by one or more of: 1) plugging the flash drive into a USB port on the personal computer, 2) pushing a button on the flash drive, 3) bringing the NFC radio in the flash drive within range of the NFC radio in the personal computer. Turning off the power in the flash drive may be triggered by one or more of: 1) unplugging the flash drive from a USB port on the personal computer, 2) pushing a button on the flash drive, 3) terminating the non-NFC radio link when the NFC radio on the flash drive is out of range of the NFC radio in the personal computer, 4) not transferring data between the personal computer and the NV memory in the flash drive for a predetermined period of time. Initiating a non-NFC link between the flash drive and the personal computer may be triggered by one or more of: 1) initiating an NFC link between the flash drive and the personal computer, 2) pushing a button on the flash drive.

The combination of a battery, a USB connector, and an inductive charger may also be used in ways other than that previously described. For example, the flash drive may communicate with the personal computer wirelessly even though it is connected to the personal computer's USB port. Alternately, the flash drive may communicate with the personal computer wirelessly through its non-NFC radio, while the flash drive is recharging its battery inductively. In another embodiment, the flash drive may communicate with the personal computer wirelessly while the flash drive is receiving power through its USB connector from a device other than the personal computer (such as, but not limited to, a USB-based battery charger). Each of these techniques may allow the battery to be charging while communication is taking place. Also, each of these techniques may allow the flash drive to communicate wirelessly without a battery, since it will be receiving electrical power from an external device.

The foregoing description is intended to be illustrative and not limiting. Variations will occur to those of skill in the art. Those variations are intended to be included in the various embodiments of the invention, which are limited only by the scope of the following claims.

What is claimed is:
1. An apparatus for wireless communication, comprising:
  a wireless flash drive containing:
    a wired universal serial bus (USB) interface;
    a first near field communication (NFC) radio configured to:
      control the wireless flash drive to identify a signal received from a second NFC radio associated with a wireless device,
      control the wireless flash drive to apply power, associated with the received signal, to the first NFC radio, and
      power up a non-NFC radio, within the wireless flash drive, based at least in part on the wireless flash drive applying power on the first NFC radio,
    a non-volatile memory; and
    a battery to provide electrical power to the non-NFC radio and the non-volatile memory, wherein the wireless flash drive contains first instructions to:
    establish an NFC wireless communication link between the first NFC radio and the second device;
    use the NFC wireless communication link to establish a non-NFC wireless communication link between the non-NFC radio and the second device;
    determine that no time out has occurred on the non-NFC wireless communication link:
    transfer data between the non-volatile memory and the second device over the non-NFC wireless communication link, after determining that no timeout has occurred on the non-NFC wireless communication link;
    detect an indication to initiate a power-down operation, after determining that no timeout has occurred on the non-NFC wireless communication link; and
    terminate the non-NFC wireless communication link, after determining that no timeout has occurred on the non-NFC wireless communication link.
2. The apparatus of claim 1, wherein the wireless flash drive is configured to provide to the second device, over the NFC link, at least one security key for use in establishing the non-NFC communication link.

3. The apparatus of claim 1, wherein the wireless flash drive is configured to transfer the data between the non-volatile memory and the second device through the wired USB interface.

4. The apparatus of claim 1, wherein the non-volatile memory contains second instructions to be executed by the second device, wherein the wireless flash drive is configured to transfer the second instructions to the second device through the wired USB interface.

5. The apparatus of claim 1, wherein the first non-NFC radio comprises a radio selected from a list of radios consisting of 1) a WIFI radio, 2) a Bluetooth radio, and 3) a 60 GHz radio.

6. The apparatus of claim 1, wherein the wireless flash drive includes a switch which when activated, causes the first NFC radio to become activated.

7. The apparatus of claim 1, wherein the wireless flash drive includes charging circuitry to charge the battery using inductive energy received from the second device.

8. The apparatus of claim 1, wherein the wireless flash drive includes a visual indicator to indicate when at least one of the wireless links is active.

9. A computer-readable non-transitory storage medium that contains instructions, where when executed by one or more processors result in performing operations comprising:
  controlling a first near field communication (NFC) radio within a wireless flash drive to identify a signal received from a second NFC radio associated with a wireless device,
  controlling the first NFC radio to initiate a supply of power, associated with the received signal, to the first NFC radio within the wireless flash drive, and
  powering up a non-NFC radio, within the wireless flash drive, based at least in part on the one or more processors applying power to the first NFC radio;
  establishing an NFC wireless communication link between the NFC radio and the wireless device;
  using the NFC wireless communication link to establish a non-NFC wireless communication link between the non-NFC radio and the wireless device;
  determining that no timeout has occurred on the non-NFC wireless communication link;
  transferring data between a non-volatile memory in the wireless flash drive and the wireless device over the non-NFC wireless communication link, after determining that no timeout has occurred on the non-NFC wireless communication link;
  detecting an indication to initiate a power-down operation, after determining that no timeout has occurred on the non-NFC wireless communication link; and
  terminating the non-NFC wireless communication link, after determining that no timeout has occurred on the non-NFC wireless communication link.

10. The computer-readable non-transitory storage medium of claim 9, wherein the operations further comprise providing to the wireless device, over the NFC wireless communication link, at least one security key for use in establishing the non NFC wireless communication link.

11. The computer-readable non-transitory storage medium of claim 9, wherein the operations further comprise transferring the data between the non-volatile memory and the wireless device through a wired USB interface.

12. The computer-readable non-transitory storage medium of claim 9, wherein the operations further comprise transferring, to a second device through a wired USB interface, second instructions that are to be executed by the second device to establish a first NFC interface.

13. The computer-readable non-transitory storage medium of claim 9, wherein the operations further comprise activating the first NFC radio response to receive a signal from a switch.

14. An apparatus for wireless communication comprising:
  a processor;
  a memory;
  a first NFC radio configured to:
    control the apparatus to send a signal from the first NFC radio to a second NFC radio within a wireless flash drive;
  a first non-NFC radio, wherein the apparatus is configured to:
    establish a NFC wireless communication link with the second NFC radio within the wireless flash drive;
    use the NFC wireless communication link to establish a non-NFC wireless communication link with the a second non-NFC radio within the flash drive;
    determine that no timeout has occurred on the non-NFC wireless communication link;
    use the non-NFC wireless communication link to transfer data between the apparatus and a non-volatile memory in the flash drive, after determining that no timeout has occurred on the non-NFC wireless communication link;
    detect an indication to initiate a power-down operation, after determining that no timeout has occurred on the non-NFC wireless communication link; and
    terminate the non-NFC wireless communication link, after determining that no timeout has occurred on the non-NFC wireless communication link.

15. The apparatus of claim 14, wherein the first non-NFC radio is selected from a list of radios consisting of: 1) a WiFi radio, 2) a Bluetooth radio, and 3) a 60 GHz radio.

16. The apparatus of claim 14, wherein the apparatus is configured to:
  upload software from the flash drive; and
  use the software to establish the non-NFC wireless communication link.

17. The apparatus of claim 14, wherein the apparatus is configured to
  set a timer in connection with the transfer of data between the apparatus and a non-volatile memory in the flash drive, and
  determine that the timer has timed out and the transfer of data between the apparatus and a non-volatile memory in the flash drive has ended.

18. A computer-readable non-transitory storage medium that contains instructions, which when executed by one or more processors result in performing operations comprising:
  controlling a first near field communication (NFC) radio to send a signal to a second NFC radio within a wireless flash drive;
  controlling the first NFC radio to establish an NFC wireless communication link with the second NFC radio within the wireless flash drive;
  using the NFC wireless communication link to establish a non-NFC wireless communication link with the flash drive;
  determining that no timeout has occurred on a non-NFC wireless communication link;
  using the non-NFC wireless communication link to transfer data between the apparatus and a non-volatile memory in the flash drive, after determining that no timeout has occurred on the non-NFC wireless communication link;

detecting an indication to initiate a power-down operation, after determining that no timeout has occurred on the non-NFC wireless communication link; and terminating the non-NFC wireless communication link, after determining that no timeout has occurred on the non-NFC wireless communication link.

19. The medium of claim 18, wherein the operations further include establishing the first non-NFC wireless communication link with a radio selected from a list of radios consisting of: 1) a WiFi radio, 2) a Bluetooth radio, and 3) a 60 GHz radio.

20. The medium of claim 18, wherein the operations further include:

uploading software from the flash drive; and using the software to establish the non-NFC wireless communication link.

* * * * *